(12) United States Patent
Biswas

(10) Patent No.: US 11,686,504 B2
(45) Date of Patent: Jun. 27, 2023

(54) METHOD OF USING STORED SOLAR HEAT FOR WATER HEATING

(71) Applicant: Dipak R. Biswas, Northborough, MA (US)

(72) Inventor: Dipak R. Biswas, Northborough, MA (US)

( * ) Notice: Subject to any disclaimer, the term of this patent is extended or adjusted under 35 U.S.C. 154(b) by 232 days.

(21) Appl. No.: 16/941,663

(22) Filed: Jul. 29, 2020

(65) Prior Publication Data
US 2022/0034551 A1     Feb. 3, 2022

(51) Int. Cl.
| | |
|---|---|
| *F24S 20/20* | (2018.01) |
| *F24S 20/40* | (2018.01) |
| *F24S 60/00* | (2018.01) |
| *F24S 70/12* | (2018.01) |
| *F24S 80/65* | (2018.01) |
| *F24S 70/16* | (2018.01) |
| *F24S 80/00* | (2018.01) |
| *F24S 23/30* | (2018.01) |
| *F24S 23/70* | (2018.01) |
| *F24S 50/40* | (2018.01) |

(52) U.S. Cl.
CPC ............... *F24S 20/20* (2018.05); *F24S 20/40* (2018.05); *F24S 50/40* (2018.05); *F24S 60/00* (2018.05); *F24S 70/12* (2018.05); *F24S 70/16* (2018.05); *F24S 80/65* (2018.05); *F24S 23/31* (2018.05); *F24S 23/70* (2018.05); *F24S 2080/011* (2018.05); *F24S 2080/012* (2018.05); *F24S 2080/018* (2018.05)

(58) Field of Classification Search
None
See application file for complete search history.

(56) References Cited

U.S. PATENT DOCUMENTS

| | | | | |
|---|---|---|---|---|
| 1,661,473 | A * | 3/1928 | Goddard | F24S 60/00 60/915 |
| 3,998,205 | A * | 12/1976 | Scragg | B01J 19/127 126/609 |
| 4,018,212 | A * | 4/1977 | Hein | F24S 20/20 126/681 |
| 4,068,474 | A * | 1/1978 | Dimitroff | F24S 23/30 126/584 |
| 4,280,482 | A * | 7/1981 | Nilsson, Sr. | F03G 6/067 126/618 |
| 4,397,152 | A * | 8/1983 | Smith | F24S 23/12 126/684 |
| 4,449,515 | A * | 5/1984 | Nilsson, Sr. | F24S 60/00 126/633 |

(Continued)

*Primary Examiner* — Avinash A Savani
*Assistant Examiner* — Deepak A Deean
(74) *Attorney, Agent, or Firm* — Armis IP Law, LLC

(57) ABSTRACT

A novel method is described for water heating using stored solar heat. Solar heat is stored in an insulated tank by using scrap and inexpensive heat absorbing or heat storing materials. Stored solar heat can then be used to heat water in a storage tank by extracting the solar heat using an antifreeze liquid which in turn heat cold water in the water tank. Water temperature in the storage tank is controlled by a thermostat. When the water temperature drops below the set point on the thermostat, a circulating pump turns on and pump the cold water until it reaches the desired set temperature. Once it reaches the set point in the thermostat, the water circulation pump turns off.

20 Claims, 4 Drawing Sheets

(56) References Cited

U.S. PATENT DOCUMENTS

| | | | | |
|---|---|---|---|---|
| 4,466,423 A * | 8/1984 | Dolan | F24S 25/50 |
| | | | 353/3 |
| 4,619,244 A * | 10/1986 | Marks | F24S 30/48 |
| | | | 126/618 |
| 4,841,946 A * | 6/1989 | Marks | F24S 23/79 |
| | | | 126/618 |
| 5,271,086 A * | 12/1993 | Kamiyama | F24H 1/142 |
| | | | 137/341 |
| 5,685,289 A * | 11/1997 | Yogev | F28D 20/025 |
| | | | 126/618 |
| 8,413,442 B2 * | 4/2013 | Tarabishi | F03G 6/065 |
| | | | 126/607 |
| 8,770,186 B2 * | 7/2014 | Clue | F24S 23/71 |
| | | | 126/684 |
| 8,776,784 B2 * | 7/2014 | Bennett | F24S 60/00 |
| | | | 126/684 |
| 9,252,701 B1 * | 2/2016 | Tarabishi | F24S 70/16 |
| 10,208,735 B1 * | 2/2019 | Anthony | F22B 3/06 |
| 10,533,776 B2 * | 1/2020 | Hung | F24S 60/00 |
| 2003/0159690 A1 * | 8/2003 | Butler | F24S 80/20 |
| | | | 126/584 |
| 2009/0173336 A1 * | 7/2009 | Leiter | F28D 20/021 |
| | | | 165/104.11 |
| 2010/0207951 A1 * | 8/2010 | Plaisted | F24D 19/1042 |
| | | | 345/473 |
| 2010/0245103 A1 * | 9/2010 | Plaisted | F24F 5/0096 |
| | | | 340/657 |
| 2017/0074548 A1 * | 3/2017 | Hung | F28D 20/00 |

* cited by examiner

METHOD OF USING STORED SOLAR HEAT FOR WATER HEATING

BACKGROUND OF THE INVENTION

The present invention is in the field of solar water heating by a novel method using stored solar heat. More particularly, the present invention uses heat storing materials that absorb solar heat using reusable, inexpensive available materials along with a backup heating method when solar radiation is not sufficiently available.

Solar hot water heater is used extensively. It Is done by absorbing solar radiation on a black metal plate and extracted the heat by pumping an antifreeze liquid which in turn heat cold water in the water storage tank. When it is overcast, rainy or snowy day, the heat generation from solar radiation is relatively low and cannot make enough hot water to fulfil the demand. Since the sun doesn't shine all the time, storage of solar heat is very useful for later use when there is a demand for hot water. The present invention showed a novel method of storing solar heat for a long period of time and can be used later to heat water in the storage tank to meet the demand. Additionally, when the solar rays are not sufficiently available, an auxiliary heating method will generate enough heat for heating the hot water to fulfill the demand.

SUMMARY OF THE INVENTION

In accordance with one embodiment of the invention, the present invention relates to a method of storing solar heat in an insulated tank and heating up the water using the stored solar heat. Solar heat can be stored in the insulated tank by using reusable and inexpensive abundantly available heat absorbing or heat storing materials. The stored heat can then be used to heat water in the storage tank by extracting the heat using an antifreeze liquid which in turn heat cold water in the water tank.

BRIEF DESCRIPTION OF DRAWINGS

Above-mentioned and other features and objectives of this invention will become more apparent by reference to the following description taken in conjunction with the accompanying drawing, in which.

DETAIL DESCRIPTION OF THE PREFERRED EMBODIMENTS

Typically concentrated solar power (CSP) uses solar rays to concentrate using mirrors and reflectors for generating electricity by using high heat generated by the CSP. The generated heat heats up molten salt to nearly 1050 F and can be used for generating steam. This steam can drive a steam turbine to generate large amount of electricity (1). In stead of generating large amount of electricity from CSP, the present invention uses the concentrated solar rays to store heat for water heating using reusable and inexpensive abundantly available heat absorbing or heat storing materials.

Figure 1:
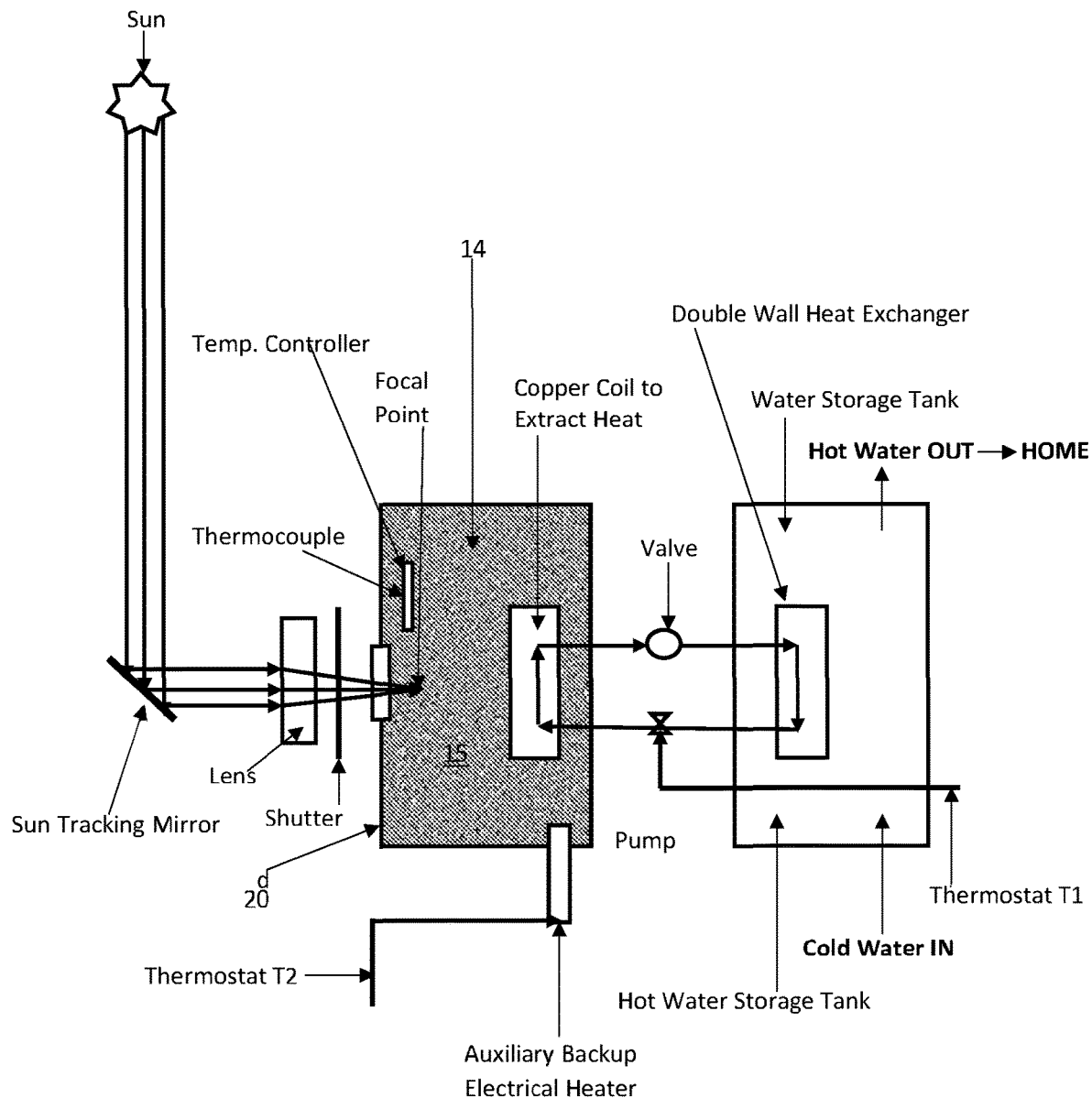
FIG. 1. is a schematic view of the solar water heating system with a reflective mirror and an auxiliary backup electrical heating method.
Figure 2:
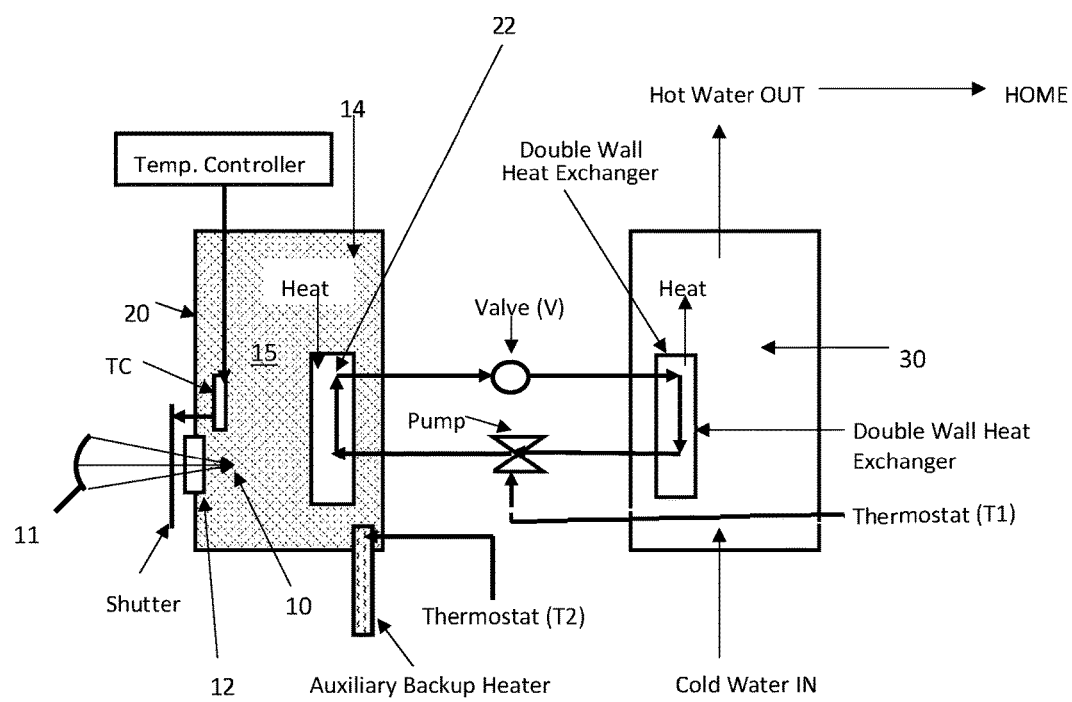
FIG. 2. is a schematic view of the solar water heating system with a parabolic mirror and an auxiliary backup electrical heating method.

Sunrays are reflected from a mirror and directed to a lens (convex, Fresnel) or a parabolic mirror or a magnifying glass for concentrating incident solar rays into a heat insulated storage tank (HIST). High temperature resistant ceramic fiber blanket is used to insulate the storage tank. Ceramic insulating blankets can withstand temperature in excess of 1800 F. Commercial manufactures, such as: Unitherm International, Unifrax, Thermaxx, Morgan Advanced materials supply thermal insulation products which can be used in the HIST. When a mirror is used, reflected rays pass through a quartz window as shown in FIG. 1 and concentrated by using a lens at the focal point where an intense heat is generated. When a parabolic mirror is used, the incident solar rays also passes through a quartz window and are concentrated at the focal point where an intense heat is generated as shown in FIG. 2. In the heat storing tank, heat absorbing or heat storing materials such as: sand, stone, rocks, bricks, concrete, marble, scrap steel and iron are used to store heat because of their low specific heat which is a measure of their heat capacity as shown in Table 1.

TABLE 1

| Specific heat of some common materials | |
| --- | --- |
| Materials | Specific Heat, J/Kg C. |
| Water | 4182 |
| Sand | 830 |
| Stone | 920 |
| Steel | 490 |
| Iron | 450 |

Sand, steel and iron have a much lower specific heat than water and that's why sand gets hotter faster than water. Also rocks and stones are commonly used in sauna to store heat as they absorb heat, store and release that heat with time.

Some of the heat conducting materials such as: scrap aluminum, iron and copper plates, rods or filings are also placed inside the insulated tank. They are used for conducting the heat from the focal point of the solar rays to the surrounding heat absorbing materials inside the insulating tank for achieving a steady state temperature.

Thermal conductivity is a measure of material's ability for allowing heat to conduct. Denser material such as metals are good conductors whereas less dense materials and gases are poor conductor (called insulators). Thermal conductivity of selected materials is shown in Table 2.

| Table 2 Thermal conductivity of selected materials | |
| --- | --- |
| Materials | Thermal conductivity, W/(m K) |
| Aluminum | 220-240 |
| Copper | 350-400 |
| Silver | 350-425 |
| Iron | 50-80 |
| Water | 0.06 |

The ideal heat storing or heat absorbing material should be dense and heavy so that it can absorb and retain significant amounts of heat. Scrap stainless steel, iron, sand, stone, concrete and marble are suitable for this purpose. They are abundantly available and inexpensive. Metallic material such as steel can retain or store heat as it remains hot for the longest period of time. As the sun rays are focused either through a lens (light concentrator) and pass through a quartz window 12, or through a parabolic mirror 11 and pass through a quartz window, intense heat is generated at the focal point 10. Intense heat is then transferred to the surrounding area using heat conducting materials 15 such as scrap aluminum, and copper. Aluminum or copper can be in the form of plates, rods or filings. As concentrated solar rays at the focal point generate heat, (as high as 900-1100 F, referenced in 2-4), this heat is conducted through scrap aluminum or copper to the heat absorbing materials 14 and stores the heat. When the steady state temperature in the HIST reaches around 500 F, a heat transfer liquid, such as: antifreeze is pumped through a doubled wall heat exchanger into the insulated HIST. The antifreeze extract heat from HIST and gets heated in the copper coil 22. This heated antifreeze liquid then passes through a valve to the water storage tank 30 and transfers heat to the stored water as shown in FIGS. 1 and 2. When the water temperature reaches the required set temperature of say 120 to 130 degrees F. which is typical for a hot water storage tank, thermostat T1 will shut off the pump. When the water temperature in the water storage tank falls 30 below the set point of 130 F, the thermostat (T1) will turn on automatically and the antifreeze liquid will pump through the double wall heat exchanger and copper coil 22 in the HIST to the storage tank.

In order to control the temperature inside the solar HIST, a thermocouple (TC), such as Type-K, (5) with a temperature range of −328 to 2282° F. is placed inside the heat absorbing materials and it is connected to a digital controller, such as: Omega CN 740 series (6). Type K thermocouple is connected to one side of the temperature controller CN 740 and the lens shutter (S) is connected to the other side of the same controller. When the set point temperature say 500 F is reached, the controller shuts off the shutter so that reflected rays cannot go to the insulated heat absorbing tank (FIGS. 1 and 2). When the HIST temperature goes below the set point of say 500 F, the temperature controller turns on and the shutter opens up so that the sunrays can go through the quartz window and focus inside the insulating HIST chamber. Heat generated at the focal point is then absorbed by the heat absorbing materials. The process continues till the set temperature of say 500 F is reached.

When the water temperature in the water storage tank fall below the set point say 130 F, thermostat (T1) turns on and the circulator pump starts to flow the antifreeze liquid. This liquid extracts the heat from HIST and flows into the water inside the storage tank. This in turn will raise the water temperature to 130 F till the thermostat shuts off.

From May to October when the average temperature in USA is above 60 F as shown in Table 3, solar water heater can provide enough hot water for use. But in winter months particularly in the cold belt states, when the solar water heater cannot make enough hot water to fulfil the demand, a backup water heater is needed to make enough hot water as shown in FIGS. 1 and 2.

The solar ray reflecting mirror, parabolic mirror, shutter and quartz window (in FIGS. 1 and 2) can be protected from atmospheric conditions by using an enclosure to prevent wind, rain, snow, dust like atmospheric changes.

Figure 3:
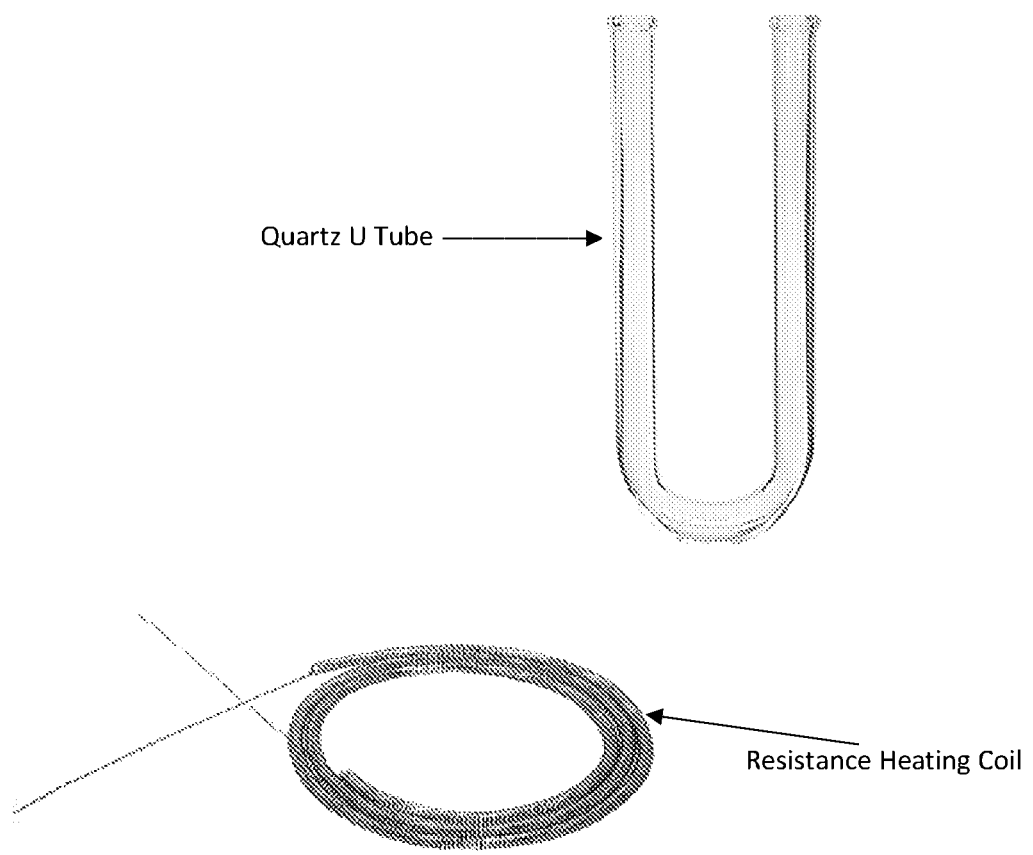
FIG. 3. is a schematic view of the back-up heating system using a resistance heating coil (R) which is placed inside a Quartz Tube (U) for a backup electrical heating.

Even though solar energy can be collected during overcast or rainy days, its efficiency drops down significantly. On overcast, rainy or snowy day or when there are not enough solar rays available, there is an auxiliary back up heating system placed inside the HIST as shown in FIGS. 1 and 2. It consists of an electrical resistance heating assembly (FIG. 3) using a resistance heating coil placed inside a quartz tube. It is placed in the heat absorbing material inside the solar HIST. Heating coil can be made of nichrome wire or others. Nichrome wires can heat up to 2100 F. One of the advantages of nichrome is that it is resistant to heat and oxidation. Heating coil assembly consists of a nichrome wire inside a quartz tube and is connected to a standard electrical outlet or it can be connected to a solar powered photovoltaic (PV) systems (a combination of solar panels, inverter, other electrical and mechanical hardware). On a sunny or overcast day, photovoltaic solar cells produce electricity and it is connected to the electrical grid. The heating assembly is also connected to a thermostat (T2). When the solar HIST temperature drops below the set point of 500 F on a cloudy or snowy day, the auxiliary heating system turns on automatically by the thermostat T2 and continues till the HIST temperature reaches 500 F. At this point the thermostat T2 will turn off. When the steady state temperature in the heat absorber tank reaches say 500 F as described earlier, a heat transfer liquid, such as: antifreeze is pumped through a doubled wall heat exchanger into the insulated HIST. The heated antifreeze liquid then passes through a valve to the water storage tank and transfers heat to the stored water as shown in FIGS. 1 and 2. When the water temperature reaches the required set temperature of 130 F which is typical for a hot water storage tank, thermostat T1 will shut off the pump. When the water temperature in the water storage tank falls below the set point of 130 F, the thermostat (T1) will turn on automatically and the antifreeze liquid will pump through the double wall heat exchanger to the storage tank.

Figure 4:
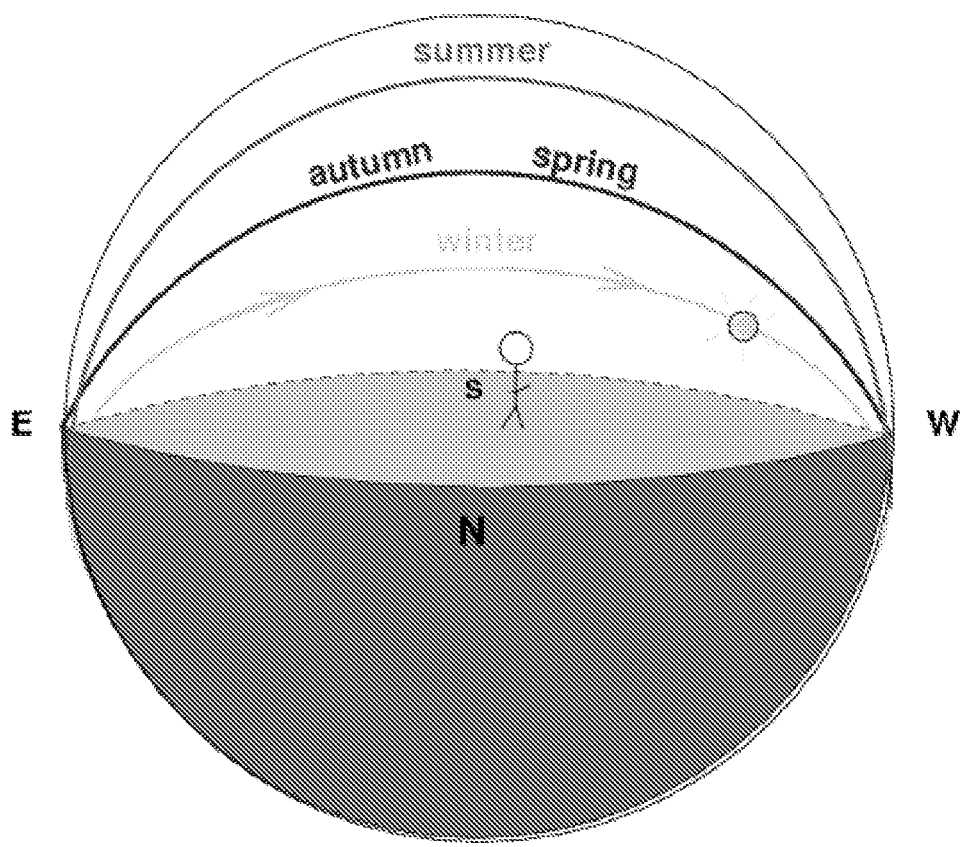
FIG. 4. is a view of a path of the sun through the sky.

A solar ray reflecting mirror or a parabolic mirror needs to track the path of the sun and keep its incoming rays focused at the focal point in order to capture most of the sunrays most throughout the day (FIG. 4). Many solar tracking systems are commercially available. Most of them are used to track the sun for operating relatively large solar panels and they are expensive. A 4 kW solar panel tracking system costs between $1400 to $2200 (7).

In the present invention, a solar tracking system is used to track a mirror or a parabolic mirror which is smaller in size

TABLE 3

Average Temperature (F.) of Different US Cities (FROM US CLIMATE DATA, https://www.usclimatedata.com/

|  | J | F | M | A | M | J | J | A | S | O | N | D |
|---|---|---|---|---|---|---|---|---|---|---|---|---|
| BOSTON | 36 | 39 | 45 | 56 | 66 | 76 | 81 | 80 | 72 | 61 | 51 | 41 |
| MIAMI | 76 | 78 | 80 | 83 | 87 | 89 | 91 | 91 | 89 | 86 | 82 | 78 |
| HOUSTON | 63 | 66 | 73 | 80 | 86 | 91 | 94 | 94 | 90 | 82 | 73 | 64 |
| CHICAGO | 32 | 34 | 43 | 55 | 65 | 75 | 81 | 79 | 73 | 61 | 47 | 36 |
| PHOENIX | 67 | 71 | 77 | 85 | 95 | 104 | 106 | 104 | 100 | 89 | 76 | 66 |
| SAN JOSE | 60 | 64 | 67 | 70 | 75 | 81 | 84 | 84 | 82 | 76 | 67 | 61 |
| SFRANCISCO | 66 | 67 | 64 | 63 | 62 | 60 | 57 | 68 | 70 | 69 | 63 | 57 | and less expensive, ranges from $147 to $569 (8-10). There are several newly developed products are commercially available.

Example 1. One such solar tracking product is Sun World's Sun Tracker (ST-600 Sun Tracker) (8). It is a single axis device that will follow the track of the sun from sunrise to sunset. This tracker is powered by using small solar panels. It is a self powered and self aligning design made by Solar Made (Patent pending).

Example 2. Another solar tracking product made by Eco-Worthy (9) is a dual axis solar tracking linear actuator controller complete electronic system dual axis solar tracker kit with linear actuators, 12V system costs $147.

Example 3. Another commercially available solar tracking product is Sunflower3 made by Wikoda, Inc. (10). The Sunflower heliostat mirror continuously tracks the sun and reflects sunlight to a fixed spot. Throughout the day, it adjusts the sunlight to the required spot, such as to the lens in FIG. 1 so that this incident sunlight can go through the lens to the focal point into the insulated HIST as described in earlier section.

REFERENCES 1. https://www.seia.org/initiatives/concentrating-solar-power:
2. Rustam HYPERLINK "https://www.researchgate.net/profile/Rustum_Tillyexodjayev" HYPERLINK "https://www.researchgate.net/profile/Rustm_Tillyexodjayey" HYPERLINK "https://www.researchgate.net/profile/Rustam_Tillyexodjayev" HYPERLINK "https://www.researchgate.net/profile/Rustam_Tillyexodjayev" HYPERLINK "https://www.researchgate.net/profile/Rustam_Tillyexodjayev" HYPERLINK "https://www.researchgate.net/profile/Rustam_Tillyexodjayev" HYPERLINK "https://www.researchgate.net/profile/Rustam_Tillyexodjayev" Tillyexodjayev
Tashkent State Technical University
Concentration known as the Scheffler reflector. Which is a parabolic antenna that uses a single axis tracking to follow the diurnal course of the Sun. These reflectors have a flexible reflecting surface that is capable of changing its curvature to adapt to seasonal variations in the angle of incidence of sunlight. The Scheffler reflector have the advantage of a fixed focal point, which is capable of reaching a temperature of 450-650° C.
3. Jairaj, K S. (2016). Re: How much heat can concentrated sunlight produce?. Retrieved from: https://www.researchgate.net/post/How_much_heat_can_concentrated_sunlight_produce/57cff15b404854bc5e65f697/citation/download.
K S HYPERLINK "https://www.researchgate.net/profile/K_S_jairaj" HYPERLINK "https://www.researchgate.net/profile/K_S_Jairaj" HYPERLINK "https://www.researchgate.net/profile/K_S_Jairaj" HYPERLINK "https://www.researchgate.net/profile/K_S_Jairaj" HYPERLINK "https://www.researchgate.net/profile/K_S_Jairaj" HYPERLINK "https://www.researchgate.net/profile/K_S_Jairaj" HYPERLINK "https://www.researchgate.net/profile/K_S_Jairaj" Jairaj 9 Sep. 2016
Chameli Devi Group of Institutions
You have not mentioned about the size of the magnifying glass to be used.
But as such it would be difficult to reach 500 degree C. using a magnifying glass I have used a Solar Concentrator Parabolic dish (SK 14) and the temperature available at the focal point was close to 210 degree C. If a parabolic dish of larger size is used and the focal point is well insulated then temperatures in the range of 300 degree C. could be achieved. Testing this practically was not possible due to limitations of the materials used and the measuring instruments.
4. Jack Dahlgren, works at NVIDIA (https://www.quora.com/Thermodynamics-What-is-the-maximum-temperature-a-1-meter-square-fresnel-lens-can-reach-at-its-focal-point), Oct. 30, 2012
Sunlight at noon supplies about 550 W of infrared energy per square meter. This varies by latitude and season. Assuming a 10% loss due to the lens, this works out to be 30K joules per minute. This is enough power to bring 100 ml of room temperature water to a boil in one minute, or if we assume that the finest focus is in an area of 1 cu cm then it would heat to 800 degrees C. Assuming perfect capture of the energy. This is complicated by the fact that as the object heats it will radiate and transmit heat at an increasing rate so even if you keep it in a vacuum, you will still lose some of the heat. Ultimately you will need to solve heat transfer and black body radiation equations for the object you are heating to determine the maximum temp. Without knowing what you are heating, that is impossible to compute.
5. Omega Engineering, https://www.omegaerig.cz/prodinfo/thermocouples.html
6. Omega Engineering, https://www.omega.com/en-us/control-and-monitoring-devices/controllers/pid-controllers/p/CN740-Series
7. https://www.solarreviews.com/blog/are-solar-axis-trackers-worth-the-additional-investment
8. Solar Made, 28007 N Prospect St., Colorado Springs, Colo. 80907, www.solarmade.com
9. Eco-Worthy, 3857 S Hill St., Los Angeles, Calif. 90037 https://www.amazon.com/ECO-WORTHY-Tracker-Linear-Actuator-Controller/dp/B00JYAIS9W/ref=psdc_2236628011_t1_B00997KGMC?th=1
10. Wikoda, Inc. 52 Bradford St, Concord, Mass. 01742, www.wikoda.com

I claim:

1. In a sunlight environment receiving solar rays of ambient sunshine, a method of storing solar heat, comprising:
concentrating the solar rays from a parabolic mirror or an angled flat mirror to a lens into an insulated heat storage tank, the insulated heat storage tank including a solid mass of heat storage materials having a heat storage capacity and selected based on a specific heat;
absorbing the concentrated solar rays from the lens at a focal point by heat conducting materials;
transferring heat to the solid mass of heat storage materials using the heat conducting materials including copper in the form of plates or rods in the surrounding area around the focal point in the insulated heat storage tank;
directing the solar rays from the angled flat or parabolic mirror through the lens, the lens aligned with a quartz window affixed to a side of the insulated heat storage tank;
conducting heat from the concentrated rays along the heat conducting materials into the insulated heat storage tank and absorbing the heat from the concentrated rays by the heat storage materials;
extending a copper coil through the insulated heat storage tank;
circulating an antifreeze liquid through the copper coil, the circulation responsive to a thermocouple within the heat storing materials for circulation and thermal extraction to water stored in a storage tank;

upon an occurrence of insufficient solar exposure, compensating the thermal extraction using backup electrical resistance heating.

2. The method as defined in claim in 1, wherein the lens is at least one of a convex or Fresnel lens.

3. The method as defined in claim 1, further comprising passing the directed solar rays through a quartz window and focusing the directed solar rays at the focal point inside the insulated heat storage tank.

4. The method as defined in claim 3, wherein the concentrated solar rays are absorbed and stored inside the insulated heat storage tank.

5. The method of claim 4, further comprising employing a high temperature resistant ceramic fiber blanket for insulating the storage tank for withstanding temperature over 1800 F.

6. The method as defined in claim 4, wherein the heat storage materials in the insulated heat storage tank are adapted for storing solar heat.

7. The method as defined in claim 6, wherein the heat storage materials include at least one of sand, stone, bricks, concrete, marble, steel and iron.

8. The method as defined in claim 7, wherein the heat storage materials include recycled scrap.

9. The method as defined in claim 6, further comprising extracting the stored solar heat by pumping an antifreeze liquid through a doubled wall heat exchanger to become heated.

10. The method as defined in claim 9, further comprising passing the heated antifreeze liquid through a valve to the water storage tank for transferring heat to the stored water in the water storage tank.

11. The method as defined in claim 10, further comprising heating stored water in the water storage tank to a required set temperature.

12. The method as defined in claim 1, wherein the electrical resistance heating includes a resistance heating coil placed inside a quartz tube.

13. The method as defined in claim 12, further comprising forming heating coil from nichrome wire.

14. The method as defined in claim 1, further comprising connecting the resistance heating assembly to an electrical outlet.

15. The method as defined in claim 1, further comprising connecting the resistance heating assembly to a solar powered photovoltaic (PV) system.

16. The method as defined in claim 15, wherein the PV system includes solar panels, inverter, electrical and mechanical hardware.

17. The method as defined in claim 14, further comprising, when the resistance heating assembly is connected to an electrical outlet, generating heat to a desired temperature set by a thermostat.

18. The method as defined in claim 17, further comprising extracting the generated heat by pumping an antifreeze from a doubled wall heat exchanger.

19. The method as defined in claim 18, further comprising passing the heated antifreeze liquid through a valve to the water storage tank for transferring heat to the stored water in the water storage tank.

20. The method as defined in claim 1 further comprising disposing the, lens, parabolic mirror or angled flat mirror and quartz window in an enclosure thereby providing protection from atmospheric conditions.

* * * * *